(12) United States Patent
Teh et al.

(10) Patent No.: US 7,805,400 B2
(45) Date of Patent: Sep. 28, 2010

(54) REPORT GENERATION USING METADATA

(75) Inventors: Jin Teik Teh, Redmond, WA (US); Karthik Ravindran, Bellevue, WA (US); Daniel Takacs, Redmond, WA (US); Samuel Hugh Skrivan, Seattle, WA (US); Manoj Nuthakki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 11/343,811

(22) Filed: Jan. 31, 2006

(65) Prior Publication Data

US 2007/0179975 A1 Aug. 2, 2007

(51) Int. Cl.
*G06F 7/00* (2006.01)

(52) U.S. Cl. .................. 707/600; 707/601; 707/603

(58) Field of Classification Search .............. 707/2, 707/101, 102, 3, 100, 600, 601, 603
See application file for complete search history.

(56) References Cited

U.S. PATENT DOCUMENTS

| | | | | |
|---|---|---|---|---|
| 5,749,079 A * | 5/1998 | Yong et al. | .................. | 707/100 |
| 5,787,416 A * | 7/1998 | Tabb et al. | ...................... | 707/2 |
| 5,832,496 A * | 11/1998 | Anand et al. | ................ | 707/102 |
| 6,993,533 B1 * | 1/2006 | Barnes | ...................... | 707/102 |
| 7,243,106 B2 * | 7/2007 | Vierich et al. | .............. | 707/102 |
| 7,266,616 B1 * | 9/2007 | Munshi et al. | .............. | 709/246 |
| 7,293,031 B1 * | 11/2007 | Dusker et al. | ................ | 707/101 |
| 7,599,935 B2 * | 10/2009 | La Rotonda et al. | .......... | 707/9 |
| 7,636,677 B1 * | 12/2009 | McGonigal et al. | .......... | 705/26 |
| 2002/0180789 A1 * | 12/2002 | Guttmann et al. | .......... | 345/760 |
| 2003/0135659 A1 * | 7/2003 | Bellotti et al. | .............. | 709/313 |
| 2004/0001104 A1 * | 1/2004 | Sommerer et al. | .......... | 345/811 |
| 2004/0006546 A1 * | 1/2004 | Wedlake et al. | ............... | 706/46 |
| 2004/0122844 A1 * | 6/2004 | Malloy et al. | ............... | 707/102 |
| 2004/0181775 A1 * | 9/2004 | Anonsen et al. | ............. | 717/104 |
| 2004/0215626 A1 * | 10/2004 | Colossi et al. | .............. | 707/100 |
| 2006/0004842 A1 * | 1/2006 | Wu et al. | .................... | 707/102 |
| 2006/0044318 A1 * | 3/2006 | Cherdron | .................... | 345/581 |
| 2006/0136436 A1 * | 6/2006 | Aftab et al. | ................. | 707/100 |
| 2006/0294098 A1 * | 12/2006 | Thomson et al. | .............. | 707/6 |
| 2007/0033088 A1 * | 2/2007 | Aigner et al. | .................. | 705/9 |
| 2007/0078823 A1 * | 4/2007 | Ravindran et al. | ............. | 707/3 |
| 2007/0180424 A1 * | 8/2007 | Kazakov et al. | ............. | 717/104 |
| 2008/0034055 A1 * | 2/2008 | Das et al. | .................... | 709/217 |
| 2008/0195579 A1 * | 8/2008 | Kennis et al. | .................. | 707/3 |

* cited by examiner

*Primary Examiner*—Apu M Mofiz
*Assistant Examiner*—Jessica N Le
(74) *Attorney, Agent, or Firm*—Joseph R. Kelly; Westman, Champlin & Kelly, P.A.

(57) ABSTRACT

A system for use in rendering a report for a client application, client server application or multi-tier applications. The system includes a report definition generator that is configured to generate a report definition using metadata located in a metadata store. A database in the application configured to receive a query and to provide a data set. A design engine is configured to render the report based on the report definition, parameters and the data set.

6 Claims, 9 Drawing Sheets

REPORT GENERATION USING METADATA

BACKGROUND

Enterprise resource planning (ERP) and customer relationship management (CRM) are phrases used to describe a broad set of activities supported by multi-module application software that helps a company or merchant manage the important parts of its business. Computerized ERP and CRM systems typically handle the logistics of various activity modules internal to a business or organization, such as accounting/financial management, customer relations management, supply chain management and human resource management. Often, ERP and CRM systems use or are integrated with a relational database management system, such as Microsoft® SQL Server®. Examples of ERP system and CRM software packages include Microsoft® Dynamics™ AX, Microsoft® Dynamics™ GP, Microsoft® Dynanmics™ NAV, Microsoft® Dynamicsυ SL and Microsoft® Dynamics™ CRM.

ERP and CRM systems utilize a large number of files that are part of a collection of information that is stored in a database shared by the various management application modules. These files represent widely varying types of information, for example including information related to transactions such as sales orders, purchase orders and bill payments and information related to reference data, such as customer profiles and shipping parameters.

A database management system uses a model-driven framework to model data that is part of the collection of information stored by the ERP or CRM system. The data can be stored in entity relationship databases that use UML (unified modeling language). An entity is a relational database data structure, which manages data. The entity preserves its internal data and the integrity of its relationships with other entities. Data of the entity is defined through its properties. In addition, entities use associations to describe relationships between entities.

In general, a database management system that an ERP or CRM system uses or is integrated with also includes reporting services for creating reports to organize and render information collected by the ERP or CRM system. However, reporting services in a database management system can be complicated and difficult to use for creating and changing reports. For example, reporting services in a database management system need to manually specify data sources as well as commands, parameters and fields used for each graphical element of the report. To change a command or data source would require adding, removing or modifying data fields.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

Information in a client application, client-server application or multi-tier applications is stored in an entity relational database that utilizes entity data structures. Each entity includes metadata. The metadata includes properties of the entity and the relationships between the entities. Reports are generated for use by the application during design-time and run-time. To generate a report, a report definition is generated from the metadata in the entity data structures. Select entity queries are accessed from the metadata in the entity data structures. A query is executed using the select entity queries against a database to retrieve a data set. The report is rendered using a design engine based on the report definition, parameters derived from the select entity queries and the data set. A report can also be rendered using a design engine based on the report definition, parameter derived from a query executed by a database management system and the data set.

DETAILED DESCRIPTION

The following description of illustrative embodiments is described in the context of a client application, client-server application or multi-tier applications. A common type of client application includes an Enterprise Resource Planning (ERP) system or Customer Relationship Management (CRM) system that can manage many different business applications of a company or a merchant with the use of a database management system and a model-driven framework. The database management system and the model-driven framework can be integrated with the client application to form a multi-tier client application or used separately as server applications.

Before describing aspects of the illustrated embodiments, however, it may be useful to describe suitable computing environments that can incorporate and benefit from these aspects. ERP and CRM systems are typically implemented in a networked environment of server computers and/or other computers. The computing environment shown in FIG. 1 is one such example.

Figure 1:
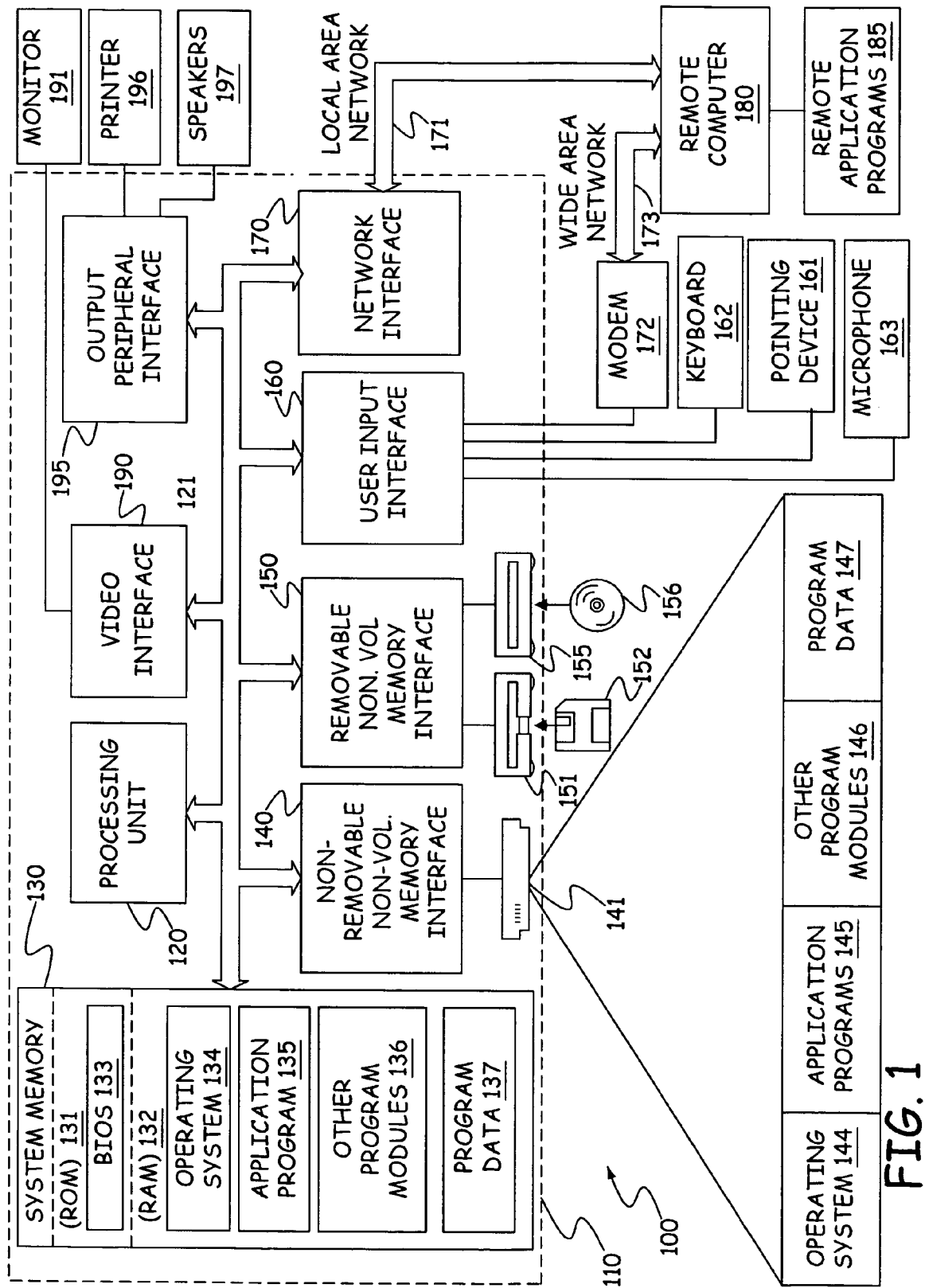
FIG. 1 illustrates a block diagram of a general computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the disclosed embodiments. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
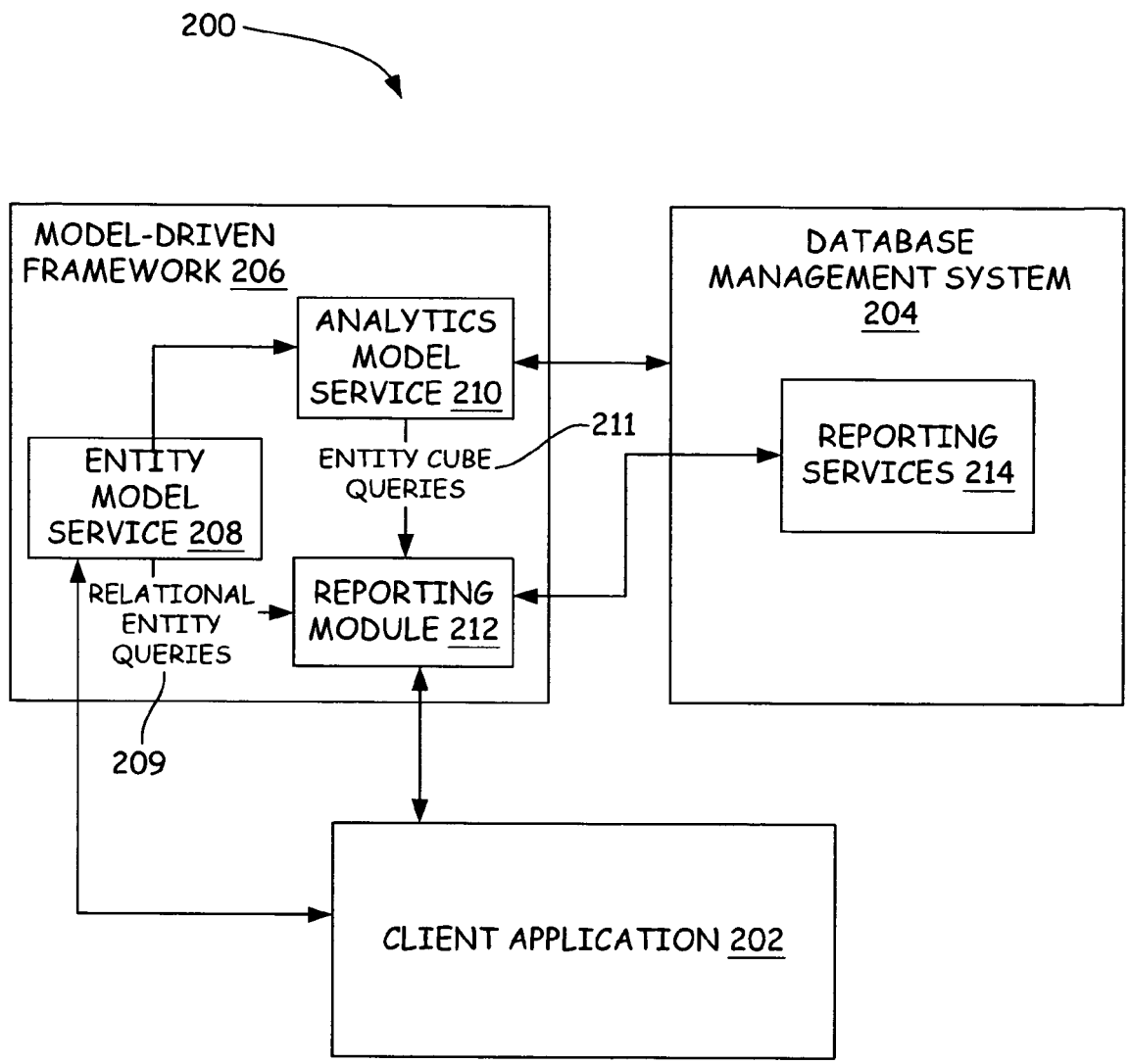
FIG. 2 illustrates a block diagram of a general environment for generating reports using information collected by an application.

FIG. 2 illustrates a block diagram of an embodiment of a general environment 200 for generating reports using information collected by an application 202. As previously discussed, an example application 202 includes an ERP system that includes a collection of business information. Environment 200 also includes a database management system 204 and a model-driven framework 206. Although FIG. 2 illustrates application 202 as being separate from database management system 204 and model-driven framework 206, it should be understood that database management system 204 and model-driven framework 206 can be integrated with application 202. In the embodiment as illustrated, database management system 204 and model-driven framework 206 can be included in separate servers or in a single server. In addition, although FIG. 2 illustrates database management system 204 as being separate from model-driven framework 206, it should be understood that model-driven framework 206 can be built on top of the database management system 204 to provide seamless interaction.

Model-driven framework 206 includes a relational entity model service 208 and an analytics model service 210. Although not illustrated in FIG. 2, entity model service 208 and analytics model service 210 can also be included in separate servers than a server for model-driven framework 206. Entity model service 208 abstracts an access layer in database management system 204 for application 202. Entity model service 208 uses UML (unified modeling language) to form entity data structures from the collection of information included in client application 202. However, entity model services 208 is not limited to the use of UML. Other types of data structures can be used. These data structures are stored in entity model service 208 in a plurality of entities. Each entity includes properties. Entity model service 208 also includes data pertaining to the relationships between entities. Both the properties of each entity and the relationships between entities are part of metadata. In addition, the properties of the report and relationship between fields and data set fields in the report can also be referred to as metadata. Report templates and the styling and formatting properties in the report templates can also referred to as metadata. A report and report template are described below in detail. Analytics model service 210 extracts metadata from entity model service 208 and transforms the metadata into multi-dimensional cube definitions or multi-dimensional data. A multi-dimensional cube definition is deployed and maintained in database management system 204 as an analytical model services cube. The multi-dimensional cube definition includes multi-sided or multi-dimensional data. Each side or dimension of the cube represents distinct categories of data such as time, products, geographical regions or sales channels. Within every dimension is included a hierarchy of data. For example, the category of time can include year, quarter, month and weekday.

Analytics model service 210 includes abstractions from analysis services databases. Analytic model service 210 reads metadata in entity model service 208 and creates or updates the abstractions of analytic model service 210. In addition, user inputs are taken into consideration when making changes to these analytics models service abstractions. The created and updates abstractions can be redeployed into the analysis service databases.

Reporting module 212 abstracts entity cube queries 211 from analytics model service 210 based on the multi-dimensional cube definitions for the design-time generation of reports by a developer and for the run-time generation of reports by a user. Entity model service 208 abstracts relational entity queries 209 based on metadata in the entity data structures. The relational entity queries 209 along with entity cube queries 211 are used in reporting module 212 of model-driven framework 206 for modeling reports. During design-time and run-time, reporting module 212 accesses client application 202 using relational entity queries and entity cube queries to return data sets for a report. During design-time, reporting module 212 accesses a database in client application 202 to return data sets for purposes of previewing a created report. During run-time, reporting module 212 accesses a database in application 202 to return data sets for purposes of interaction with a report by a user. In another embodiment, reporting module 212 can access a database that is located in a server separate from application 202. These data sets are given to reporting services 214 of database management system 204 for rendering. Reporting service 214 abstracts business reports. The reporting services 214 includes metadata that uses abstractions of the analytics model service 210 and uses abstractions of the entity model service 208 to interact with data.

Figure 3:
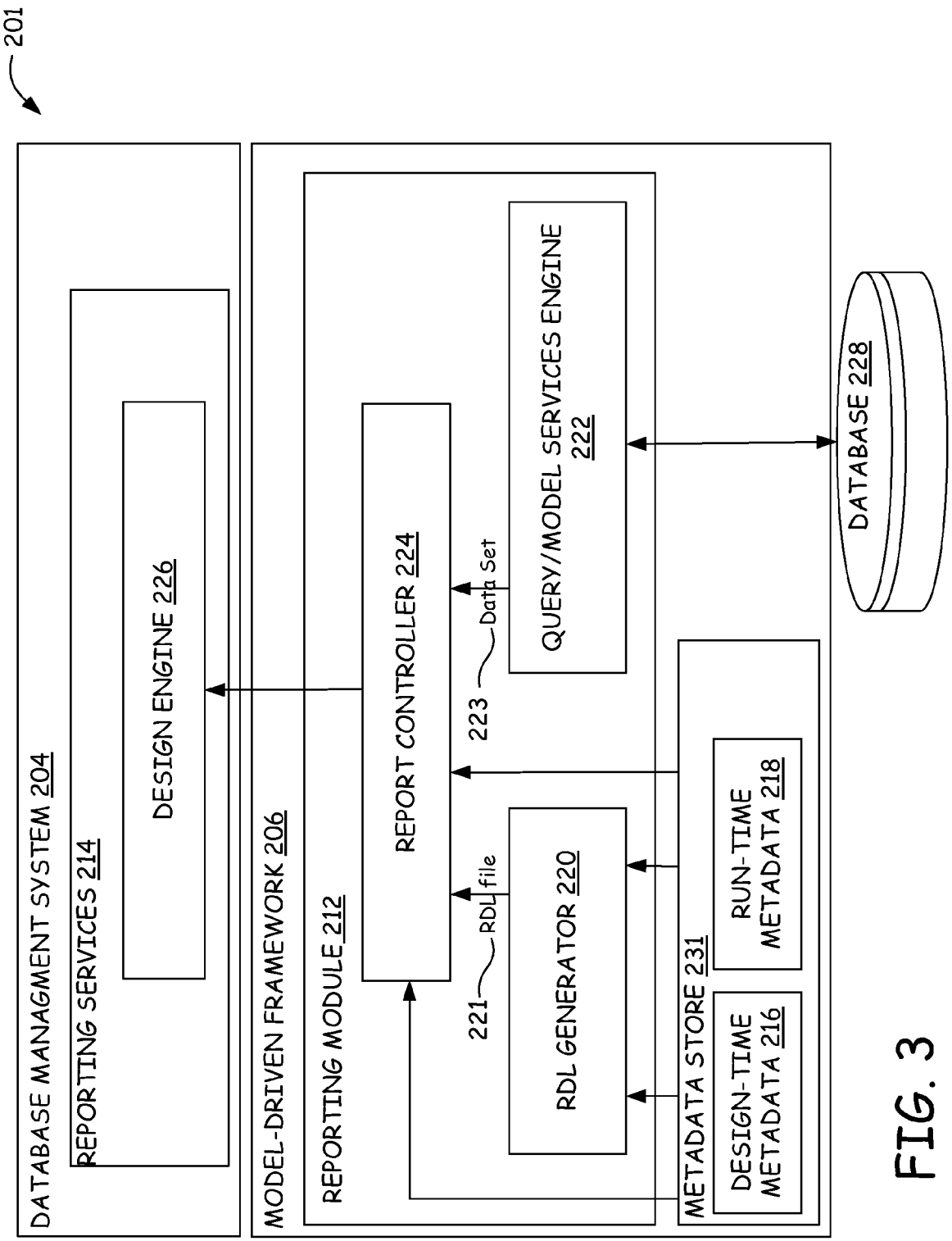
FIG. 3 illustrates a more detailed block diagram of the database management system and the model-driven framework illustrated in FIG. 2 for generating reports.

FIG. 3 illustrates a more detailed block diagram of a system 201 for generating reports. System 300 includes database management system 204 and model-driven framework 206 (illustrated in FIG. 2). Entity model service 208 and analytics model service 210 are omitted for purposes of simplification. As illustrated in FIG. 3, model-driven framework 206 includes reporting module 212 and metadata store 231. Metadata store 231 derives metadata from entity model service 208 and includes design-time metadata 216 and a run-time metadata database 218. Design-time metadata 216 includes metadata for use during design-time (i.e. during creation of a report by a developer). Run-time metadata database 218 includes metadata for use during run-time (i.e. during generation of a created report for user interaction). Reporting module 212 includes a report definition language (RDL) generator 220, a query/model services engine 222 and a report controller 224. Reporting services 214 of database management system 204 includes a design engine 226. RDL generator 220 is configured to generate a report definition using metadata in either design-time metadata 216 or run-time metadata 218 depending on whether a report is being created by a developer for previewing or whether a report is being generated to be viewed by a user. However, RDL generator 220 is also generically configured to generate a report definition using metadata in the metadata store 231 regardless if it is design-time metadata 25 or run-time metadata. The generation of a report definition is discussed in further detail in accordance with FIGS. 4 and 6. RDL generator 220 generates a report definition using metadata. RDL generator 220 takes the metadata and generates an RDL file 221 based on this information. The RDL file 221 is passed to report controller 224.

During RDL generation, query/model services engine 222 executes relational entity queries and/or entity cube queries against database 228. Database 228 is included in application 202 (FIG. 2) or as discussed previously, database 228 is included in a separate server or client application. Query/model services engine 222 retrieves a data set 223 based on the relational entity queries and/or entity cube queries and passes the data set 223 to report controller 224. Report controller 224 aggregates the RDL file 221 and data set 223 to pass to design engine 226 of database management system 204 for rendering of the report. In an alternative embodiment, query/model services engine 222 can pass data set 223 directly to design engine 226 for rendering of the report. In yet another alternative embodiment, data set 223 can be retrieved from database 228 directly based on database management system queries derived from a database management system 204 (FIG. 2) to be passed either directly to design engine 226 or to report controller 224 for aggregating before passing to design engine 226.

Figure 4:
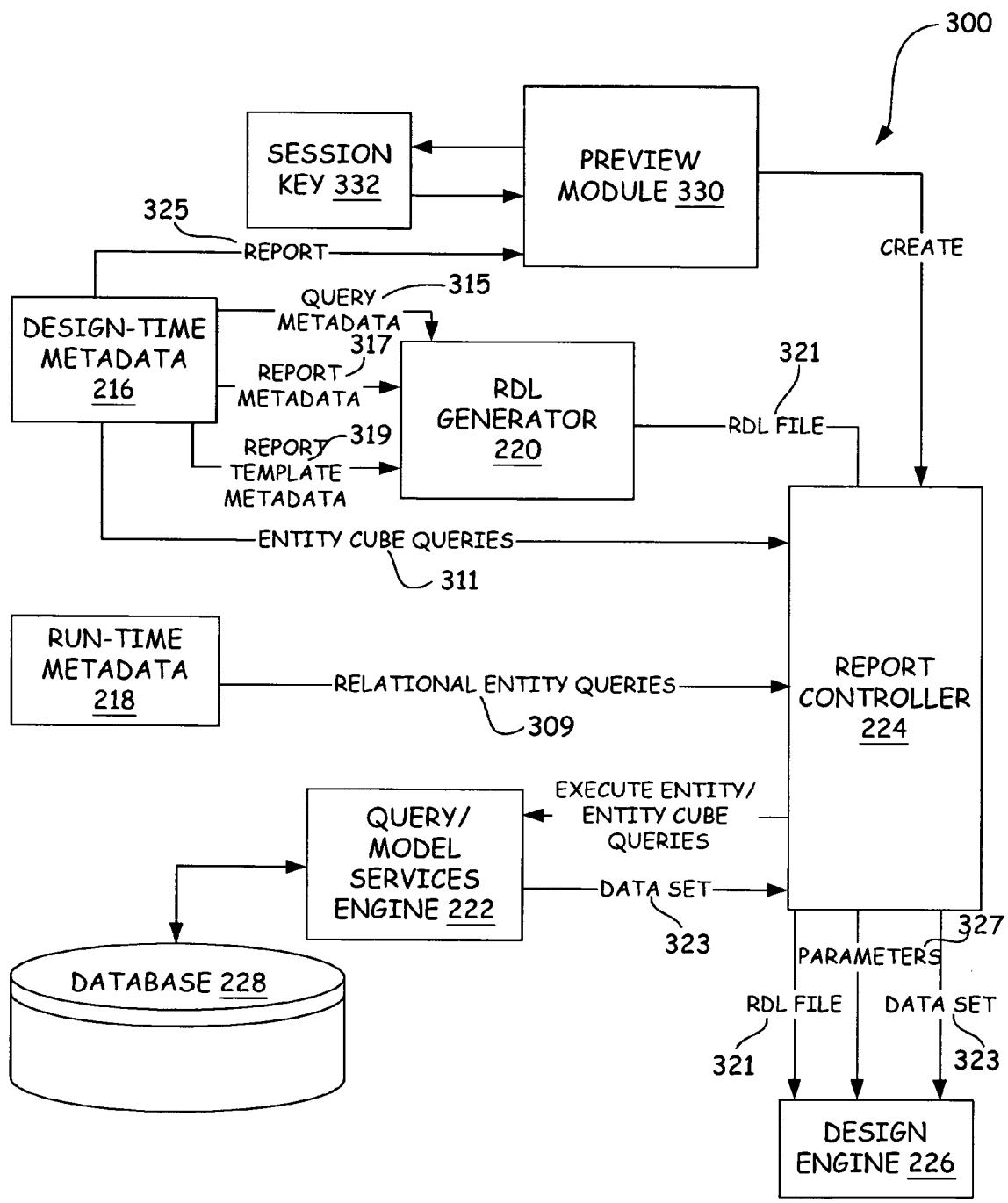
FIG. 4 is a simplified block diagram illustrating the flow of data for the generation of a report during design-time based on the environments illustrated in FIGS. 2 and 3.

FIG. 4 is a simplified block diagram 300 illustrating the flow of data for the generation of a report during design-time based on the environments illustrated in FIGS. 2 and 3. In FIG. 4, RDL generator 220 utilizes select query metadata 315, select report metadata 317 and select report template metadata 319 from design-time metadata 216 based on a report 325 that is to be generated. Query metadata 315 includes metadata related to the relational entity queries and entity cube queries abstracted from entity model service 208 and analytics model service 210 illustrated in FIG. 2. Query metadata 315 is used to generate fields and field types for column names of the data set to be retrieved. The column names can match the column names in the data set returned when executing the query for the report. Report metadata 317 includes metadata, which defines the layout of the report. In particular, report metadata 317 defines the report's header, body and footer. For example, report metadata 317 indicates whether the report's body will be shown in a table format, chart format and etc. Report template metadata 319 includes metadata which defines the look and feel of a report. For example, report template metadata 319 indicates the font, text, style of text, number, date formatting, the width and color of borders, the page margins and etc. Query metadata 315, report metadata 317 and report template metadata 319 from design-time metadata 216 are used by RDL generator 220 to generate RDL file 321 (similar to RDL file 221 generated in FIG. 3). RDL file 321 is passed to report controller 224. Select relational entity queries 309 from relational entity queries 209 (FIG. 2) abstracted from entity model service 208 (FIG. 2) and select entity cube queries 311 from entity cube queries 211 (FIG. 2) abstracted from analytics model service 210 (FIG. 2) are also passed to report controller 224. Although FIG. 4 illustrates that select relational entity queries 309 are passed from run-time metadata 218 to report controller 224 and select entity cube queries 311 are passed from design-time metadata 216 to report controller 224, both select relational entity queries 309 and select entity cube queries 311 can be accessed from in either design-time metadata 216 or run-time metadata database 218.

Block diagram 300 also includes a preview module 330. Preview module 330 receives an indication of report 325 that is to be previewed. Preview module 330 allows report controller 224 to receive information from run-time metadata 218 upon preview module 330 obtaining a validating session key 332. It should be noted that session key 332 is included for the purposes of security and user tracking. Other embodiments need not include session key 332 for previewing a report. Upon report controller 224 receiving the select relational entity queries 309 and the select entity cube queries 311, query/model services engine 222 executes the select relational entity queries 309 and select entity cube queries 311 against database 228 of client application 202 (FIG. 2) to retrieve a data set 323 (similar to data set 223 retrieved in FIG. 2). However, it should be noted that database queries that are not relational entity queries or entity cube queries can be executed against database 228. These queries can be derived from database management system 204 or other types of external data sources. The select entity cube queries 311 are also used to generate parameters 327 (i.e. query-driven filters) and filters (i.e. local filters) for the generated report. For example, a parameter can include all customers that are located in a particular country and a filter can include all customers located in a particular city of that country. It should be noted, however, that some reports may not include parameters or filters based on the select entity cube queries 311. Report controller 224 aggregates RDL file 321, parameters 327 and data set 323 to pass to design engine 226 of database management system 204 (FIGS. 2 and 3).

Figure 5:
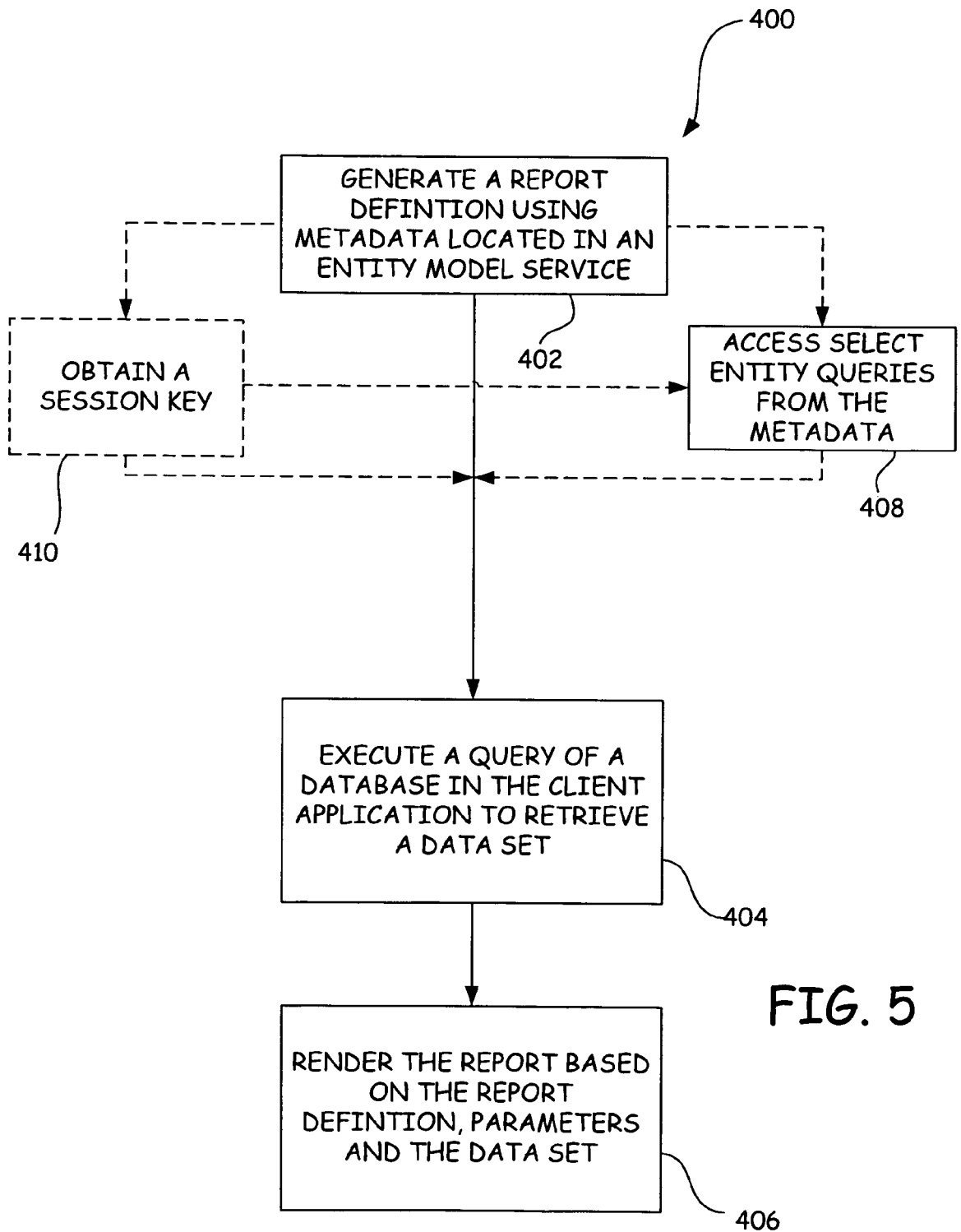
FIG. 5 illustrates a simplified flowchart illustrating a computer-implemented method of generating a report during creation of the report by a developer.

FIG. 5 illustrates a simplified flowchart 400 of generating a report during design-time (i.e. generating a report during creation of the report by a developer). At block 402, a report definition is generated using metadata derived from metadata store 231 (FIG. 2). Referring to FIG. 4, the metadata is accessed from design-time metadata 216. At block 404, a query is executed against database 228 (FIGS. 3 and 4) of application 202 (FIG. 2) to retrieve a data set 323 (FIG. 4). The query can be a query derived directly from database management system 204 (FIG. 2). At block 406, the report is rendered based on the generated report definition file 321, parameters 327 derived from the query and the data set 323.

The method can optionally proceed from block 402 to block 408 in an alternative embodiment. At block 408, select entity queries (such as select relational entity queries 309 and select entity cube queries 311 of FIG. 4) are accessed from the metadata. Select relational entity queries 309 and select entity cube queries 311 are accessible from the relational entity queries and entity cube queries abstracted from entity model service 208 and the analytics model service 210 of FIG. 2. As previously discussed both the select relational entity queries 309 and the select entity cube queries 311 are accessible from either design-time metadata 216 or run-time metadata database 218. In this alternative embodiment, at block 404, a query is executed against database 228 based on the select relational entity queries 309 and/or the select entity cube queries 311 instead of queries derived from database management system 204. At block 406, the rendered report will be based on the report definition file 321, parameters 327 and entity queries (i.e. the select relational entity queries 309 and/or the select entity cube queries 311). After the select entity queries are accessed in block 408, the method can proceed to block 404.

The method can also optionally proceed from block 402 to block 410 in another alternative embodiment. At block 410, preview module 330 (FIG. 4) is configured to obtain a session key 332 (FIG. 4) in order to access the select entity queries. After the session key is obtained, the method can proceed to block 404 or to block 408.

Figure 6:
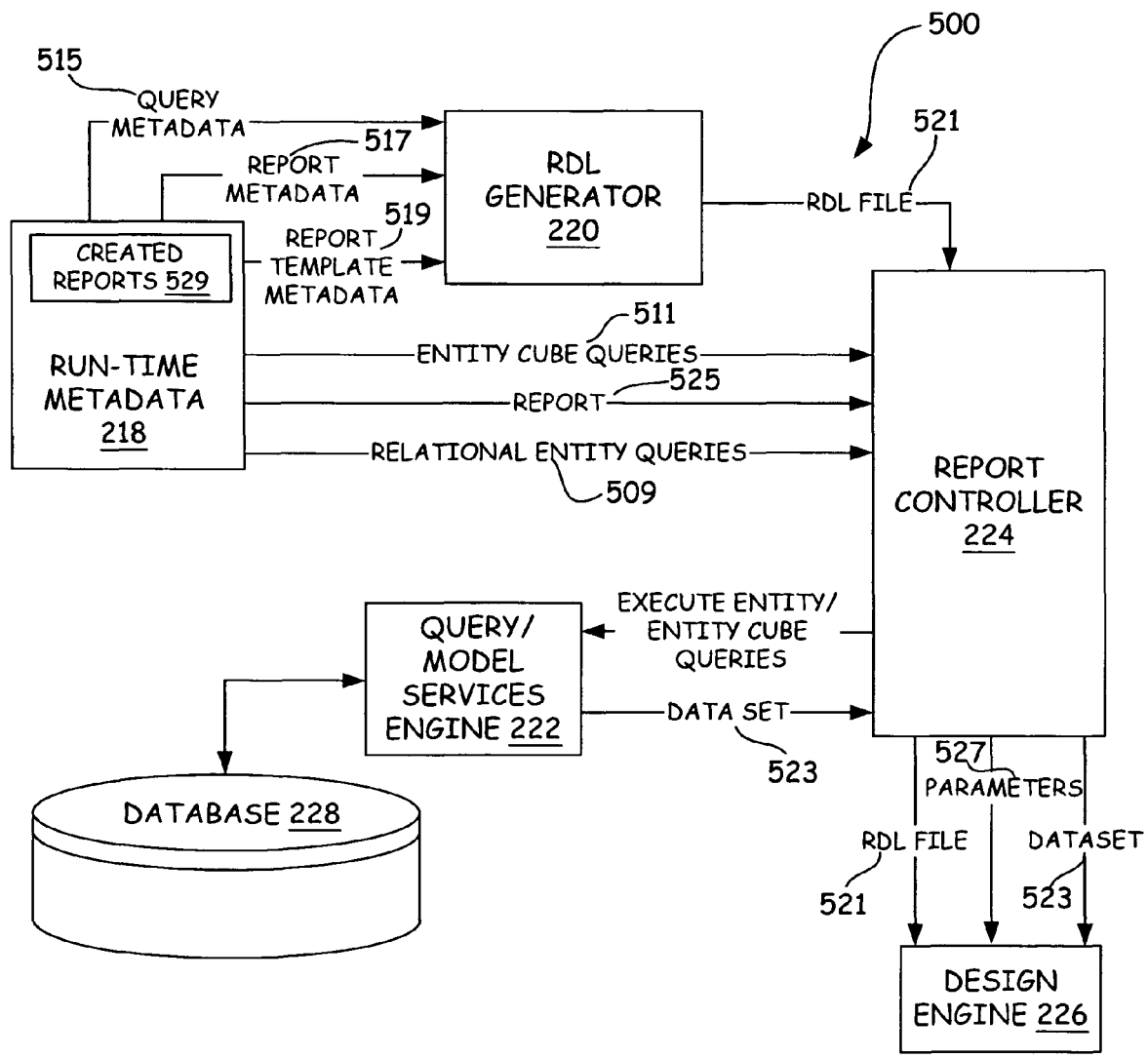
FIG. 6 is a simplified block diagram illustrating the flow of data for the generation of a report during run-time based on the environments illustrated in FIGS. 2 and 3.

FIG. 6 is a simplified block diagram 500 illustrating the flow of data for the generation of a report during run-time based on the environments illustrated in FIGS. 2 and 3. A selected report 525 from a plurality of created reports 529 (those reports that are available from developer creation) is selected by the user to be generated. The selected report 525 is passed from run-time metadata database 218 to report controller 224 as indicated. In FIG. 5, RDL generator 220 utilizes select query metadata 515, select report metadata 517 and select report template metadata 519 (similar to query metadata 315, report metadata 317 and report template metadata 319 of FIG. 4) from run-time metadata 218 based on the report 525 that is to be generated. Query metadata 515, report metadata 517 and report template metadata 519 are used by RDL generator 220 to generate an RDL file (similar to RDL file 321 of FIG. 4, but created from selected run-time metadata based on report 525 instead of design-time metadata based on report 325). It should be noted that query metadata 515 may not be needed to generate RDL file 521 if similar field information is stored in report metadata 517. The RDL file 521 is passed to report controller 224. Select relational entity queries 509 from relational entity queries 209 (FIG. 2) abstracted from entity model service 208 (FIG. 2) and select entity cube queries 511 from entity cube queries 211 (FIG. 2) abstracted from analytics model service 210 (FIG. 2) are also passed to report controller 224 from run-time metadata 218. Select relational entity queries 509 and select entity cube queries 511 are similar to select relational entity queries 309 and select entity cube queries 311 of FIG. 4. However, select relational entity queries 509 and select entity cube queries 511 are derived from run-time metadata 218 and report 525 is based on select relational entity queries 509 and entity cube queries 511.

Upon report controller 224 receiving select relational entity queries 509 and select entity cube queries 511, query/model services engine 222 executes the relational entity queries 509 and entity cube queries 511 against database 228 of client application 202 (FIG. 2) to retrieve a data set 523. In another embodiment and as previously discussed, report controller 224 can execute queries against database 228 using queries derived from database management system 204 (FIG. 2). In yet another embodiment, queries can be executed directly from database management system 204 such that the RDL file 521 and data set 523 are sent directly to design engine 226. The select entity cube queries 511 are also used to generate parameters (i.e. query-driven filters) and filters (i.e. local filters) for generating the report. It should be noted, however, that some reports may not include parameters or filters based on select entity cube queries. Report controller 224 aggregates the RDL file 521, parameters 527 and the data set 523 to pass to design engine 226 of database management system 204 (FIGS. 2 and 3). Parameters 527 and data set 523 are similar to parameters 327 and data set 323 of FIG. 4, however, parameters 527 and data set 523 are based on report 325 that is to be generated during run-time.

Figure 7:
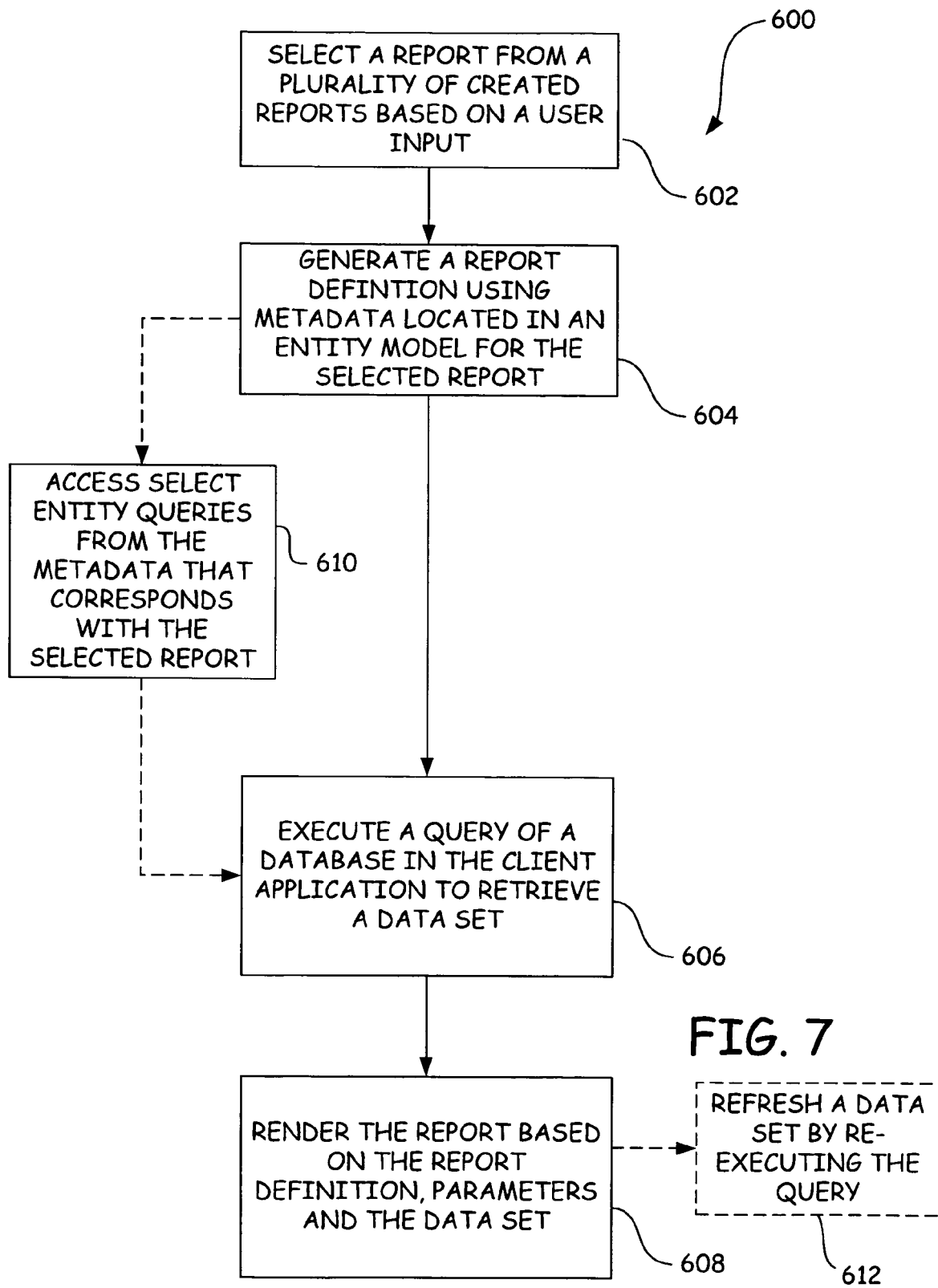
FIG. 7 illustrates a simplified flowchart illustrating a computer-implemented method of generating a report for interaction with a user.

FIG. 7 illustrates a simplified flowchart 600 of a computer-implemented method of generating a report during run-time (i.e. generating a report for interaction by a user). At block 602, a report 525 (FIG. 6) is selected from a plurality of created or available reports 529 (FIG. 6) based on a user input. At block 604, a report definition is generated using metadata derived from metadata store 231 for the selected report 525. Referring to FIG. 6, the metadata is accessed from run-time metadata database 218. At block 606, a query is executed against database 228 (FIGS. 3 and 4) of application 202 (FIG. 2) to retrieve a data set 523 (FIG. 6). At block 608, the report is rendered based on the generated report definition file 521, parameters 527 derived from the queries and the data set 523.

The method can optionally proceed from block 604 to block 610 in an alternative embodiment. At block 610, select entity queries (such as select relational entity queries 509 and select entity cube queries 511) are accessed from the metadata (i.e. query metadata 515, report metadata 517 and report template metadata 519 of run-time metadata 218) that corresponds with the selected report 525. In this alternative embodiment, at block 606, a query is executed against database 228 based on the select relational entity queries 509 and/or the select entity cube queries 511 instead of queries derived from database management system 204. At block 608, the rendered report will be based on the report definition file 521, parameters 527 and entity queries (i.e. the select relational entity queries 509 and/or the select entity cube queries 511). After the select entity queries are accessed in block 610, the method can proceed to block 606.

The method can also optionally proceed from block 608 to block 612 in an alternative embodiment. At block 612, design engine 226 is configured to refresh a data set 721 by re-executing a query based on a change in a parameter or filter. Such a flow of data is illustrated and described in accordance with FIG. 8.

Figure 8:
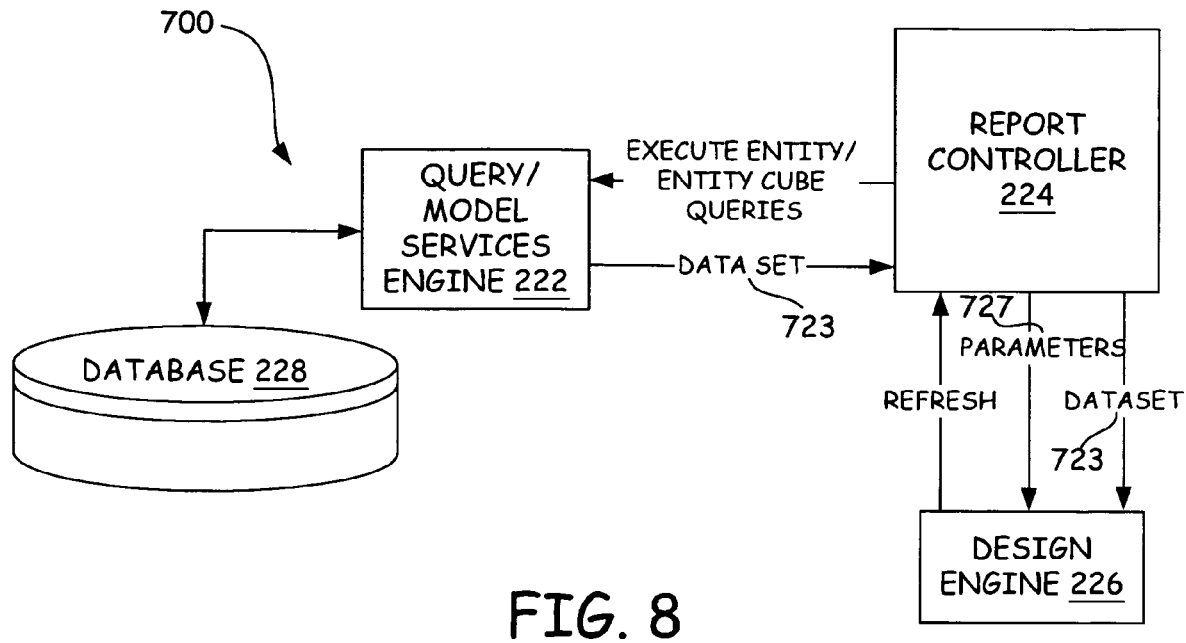
FIG. 8 is a simplified block diagram that illustrates the flow of data for the refreshing of a report during run-time based on the environments illustrated in FIGS. 2 and 3.

FIG. 8 is a simplified block diagram 700 that illustrates the refreshing of the report generated in FIG. 7 based on the environments illustrated in FIGS. 2 and 3. Example refreshing events include refreshing the latest data in a report or the changing of parameters and/or filters by a user and refreshing the latest data. In FIG. 8, a refreshing event takes place. Design engine 226 instructs report controller 224 to refresh data set 523 based on the latest parameters and filters. Query/model services engine 222 executes new select relational entity queries and/or new select entity cube queries against database 228 of client application 202 (FIG. 2) to retrieve a new data set 723. Report controller 224 re-aggregates new parameters 727 and the new data set 723 to pass to design engine 226 of database management system 204 (FIGS. 2 and 3). In an alternative embodiment, report controller 224 can initiate the refreshing of the report instead of design engine 226.

Figure 9:
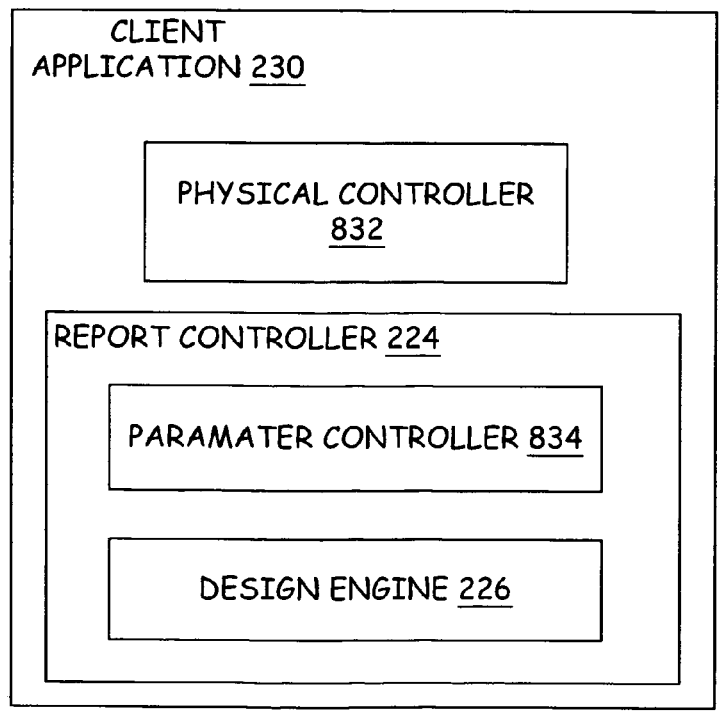
FIG. 9 is a simplified block diagram of a general environment for a client application.

FIG. 9 is a simplified block diagram of a general environment 800 for an application 230 (also illustrated in FIG. 2). For example, application 230 can be a business client application or a business web application. In the embodiment illustrated in FIG. 9, application 230 is integrated with report controller 224 (also illustrated in different embodiments in FIGS. 3, 4, 6 and 8). Besides application 230 including report controller 224, the application also includes a physical controller 832. Within report controller 224 is a parameter controller 834 that controls what filters and parameters should be applied to design engine 226 (also illustrated in different embodiment in FIGS. 3, 4, 6 and 8).

Figure 10:
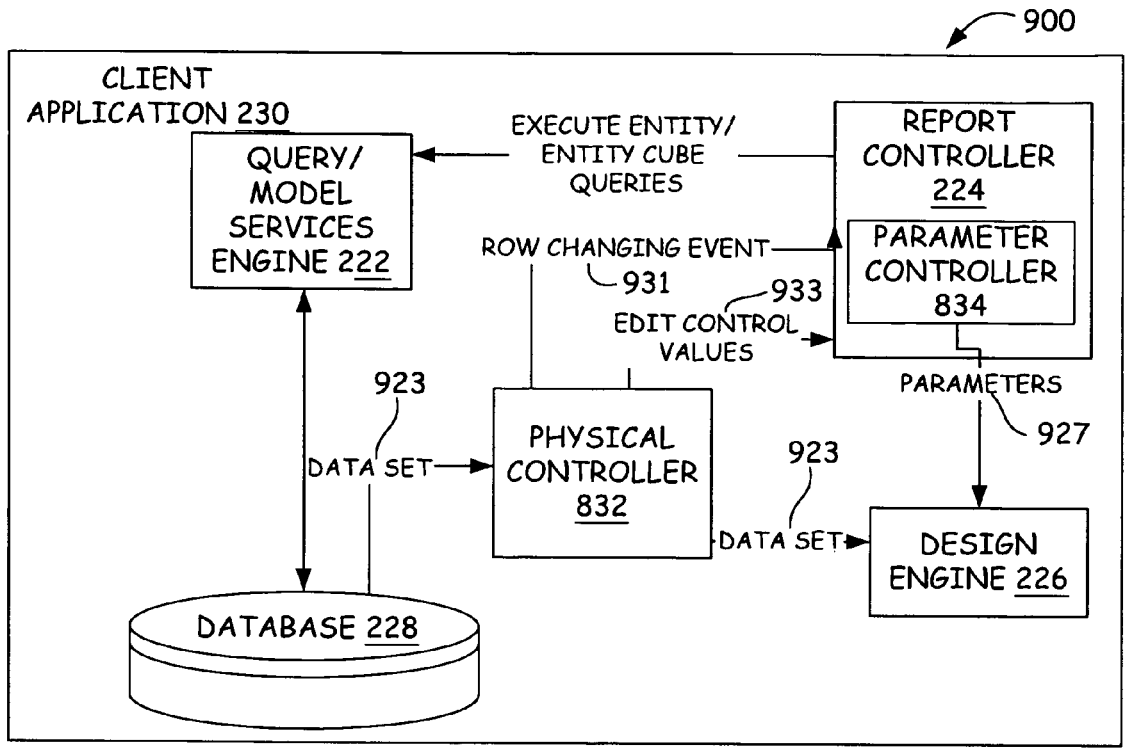
FIG. 10 is a simplified block diagram that illustrates the flow of data for the generation of a report during run-time using the environment illustrated in FIG. 9.
Figure 11:
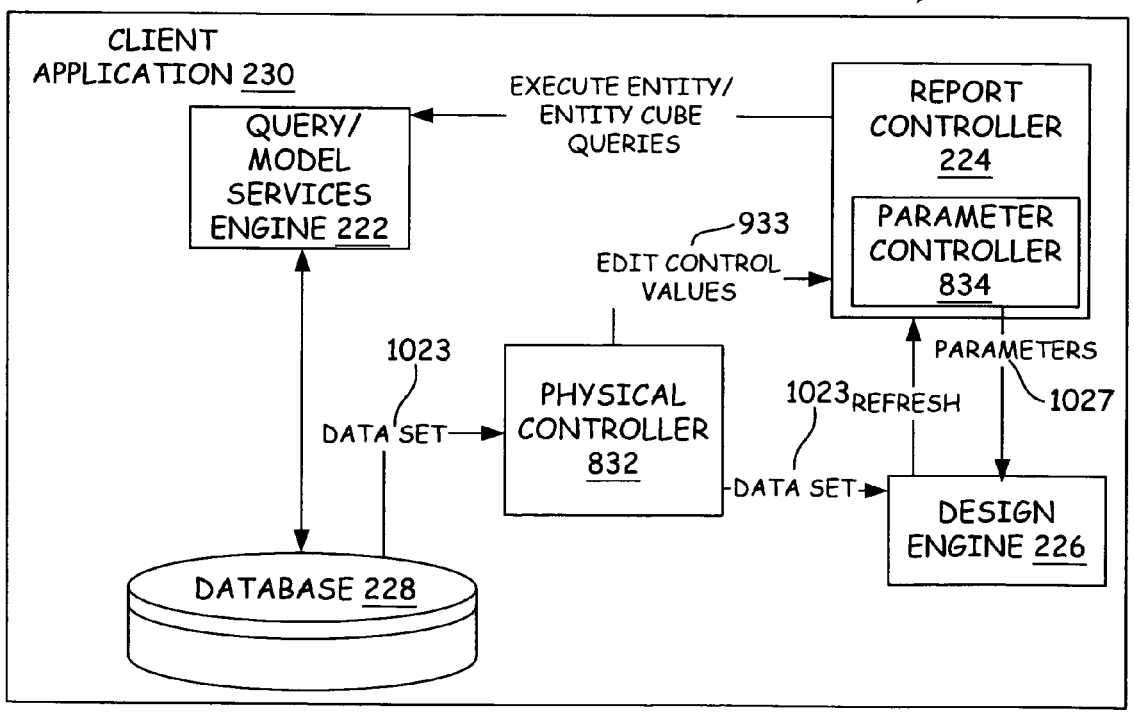
FIG. 11 is a simplified block diagram that illustrates the flow of data for the refreshing of a report during run-time based on the environment illustrated in FIG. 9.

FIG. 10 is a simplified block diagram 900 that illustrates the flow of data for generating a report during run-time for a user based on the environment illustrated in FIG. 9. Report controller 224 generates an RDL file and executes the queries (i.e. select relational entity queries and select entity cube queries) using query/model service engine 222 against database 228 as discussed in accordance with FIG. 6. In FIG. 11, query/model service 222 can be configured for use on a web server. In addition, database 228 can be a server database. The RDL file and data set 923 retrieved during the query are passed to physical controller 832 which in turn passes them to design engine 226 for rendering. Physical controller 832 of application 230 can also feed data to report controller 224 and add additional parameters and filters to report controller 224 for use by a user. For example and as illustrated in FIG. 10, physical controller 832 can feed a row changing event 931 to the report or edit control values 933 to the report. Parameter controller 834 feeds all of the parameters 927 to design engine 226 including those added by physical controller 832 and those derived from the select relational entity queries and the select entity cube queries.

FIG. 11 is a simplified block diagram 1000 that illustrates the refreshing of a report during run-time based on the environment illustrated in FIG. 9. Example refreshing events include refreshing the latest data in a report or the changing of parameters and/or filters by a user and refreshing the latest data. In FIG. 11, a refreshing event takes place. Design engine 226 instructs report controller 224 to refresh the data based on the latest parameters and filters. In FIG. 11, query/model services 222 can be configured for use on a web server. Query/model service re-executes the select relational entity queries and the select entity cube queries against database 228 to retrieve a new data set 1023. Database 228 can be a server database. The new data set 1023 is passed to physical controller 832, which in turn passes the new data set 1023 to design engine 226 for rendering. Physical controller 832 application 230 can also feed data to report controller 224 and add additional parameters and filters to report controller 224 for use by a user. For example and as illustrated in FIGS. 9 and 10, physical controller 832 can feed edit control values 933 to the report. Parameter controller 834 feeds all of the new parameters 1027 to design engine 226.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for use in generating a report for a client application, the system comprising:
   a computer storage medium including a metadata store comprising:
      design-time metadata including metadata for use in designing a report, the design-time metadata related to properties of entity data structures formed from information located in a database of the client application and related to relationships between the entity data structures;
      run-time metadata including metadata for use in generating a report previously designed, the run-time metadata related to properties of the entity data structures and related to relationships between the entity data structures;
   a processor that implements:
      a report controller receiving relational entity queries and entity cube queries from the design-time metadata stored in the metadata store and the run-time metadata stored in the metadata store;
      a report definition language generator generating a report definition using metadata from one of the design-time metadata stored in the metadata store and the run-time metadata stored in the metadata store depending on whether a report is to be designed by a developer or a select report is to be generated for interaction with a user;
      a query services engine executing a query of the database of the client application using the relational entity queries and entity cube queries received by the report controller from the design-time metadata and the run-time metadata to uncover a data set;
      a preview module that receives an indication that the report is to be previewed, the preview module obtains a validating session key to allow the report controller to decrypt and access information from the run-time metadata to preview the report; and
      a design engine rendering the report based on the report definition, parameters defined by the query of the database and the data set.

2. The system of claim 1, wherein the client application comprises at least one of an enterprise resource planning system and a customer relationship management system.

3. The system of claim 1, wherein the query services engine re-executes the query of the database based on an indication from the report controller s to refresh the dataset.

4. The system of claim 1, wherein the client application comprises a physical controller that provides the report controller with additional parameters.

5. A computer-implemented method of generating a report for a client application, the computer-implemented method comprising:
   receiving, by a processor, relational entity queries and entity cube queries from a computer storage medium having design-time metadata store and run-time metadata store, the design-time metadata for use in designing a report that are related to properties of entity data structures formed from information located in a database of the client application and related to relationships between the entity data structures and the run-time metadata for use in generating a report that are related to properties of the entity data structures and related to relationships between the entity data structures;
   generating, by the processor, a report definition using metadata from one of the design-time metadata and the run-time metadata located in the metadata storage depending on whether a report is to be designed by a developer or a select report is to be generated for interaction with a user;
   executing, by the processor, a query of the database in the client application to retrieve a data set using the relational entity queries and entity cube queries abstracted from the design-time metadata and run-time metadata stored in the metadata store;
   receiving, by a processor, an indication that the report is to be previewed and obtaining, by a processor, a validating session key to allow the report controller to decrypt and access information from the run-time metadata to preview the report; and
   rendering the report based on the generated report definition, parameters defined by the query of the database and the data set.

6. The computer-implemented method of claim 5, wherein the report is selected from a plurality of created reports based on a user input when the report is to be generated the report definition of designed reports.

* * * * *